Dec. 21, 1943.   P. V. MATHIAS ET AL   2,337,055
APPARATUS FOR AND METHOD OF ASSEMBLING
RADIO TUBES AND RADIO TUBE BASES
Filed Jan. 4, 1941   5 Sheets-Sheet 1

INVENTORS
Paul V. Mathias
and Marvin E. Mundel
BY
ATTORNEYS

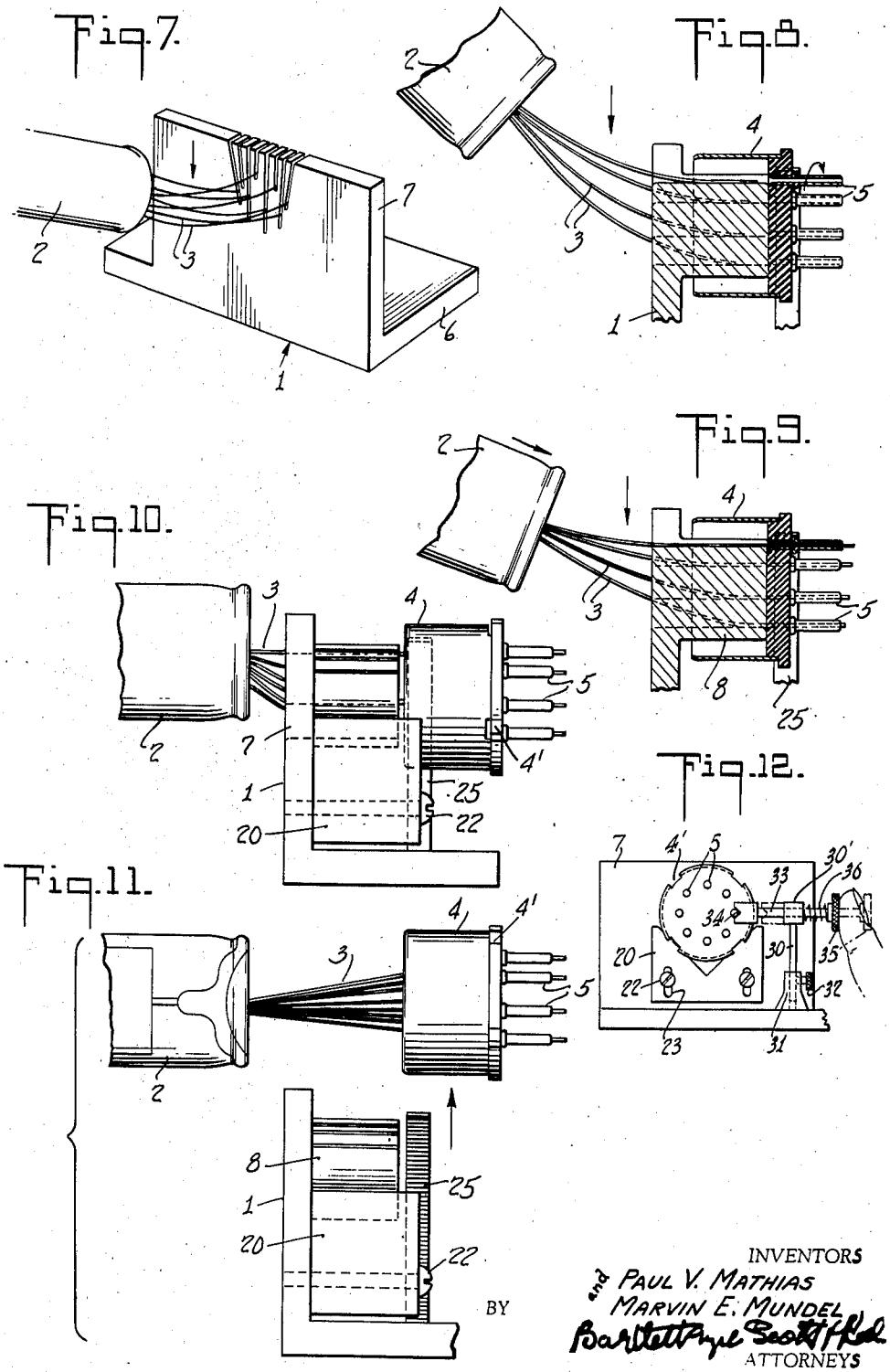

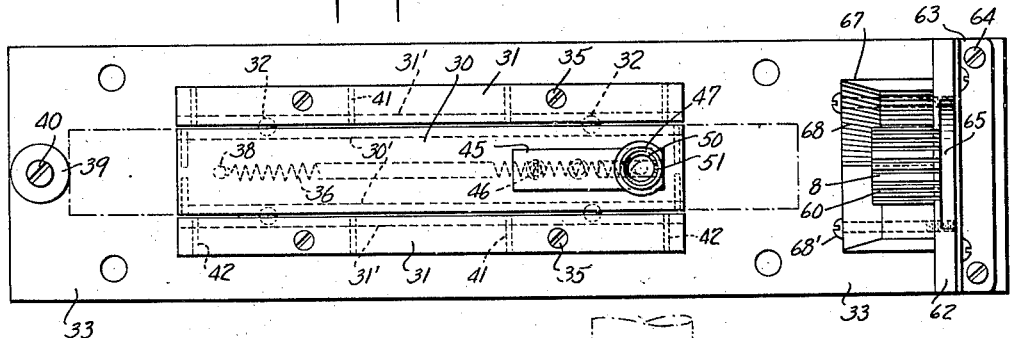
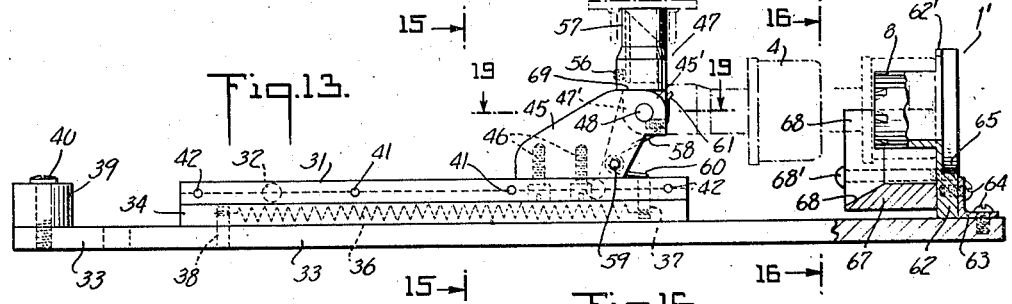
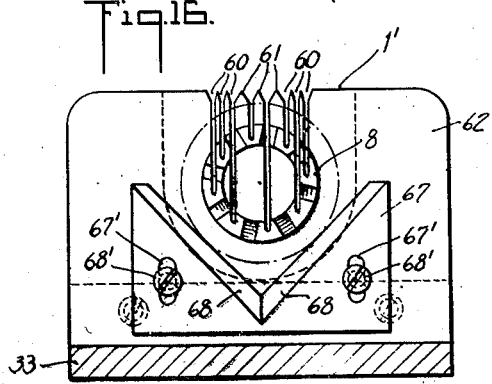
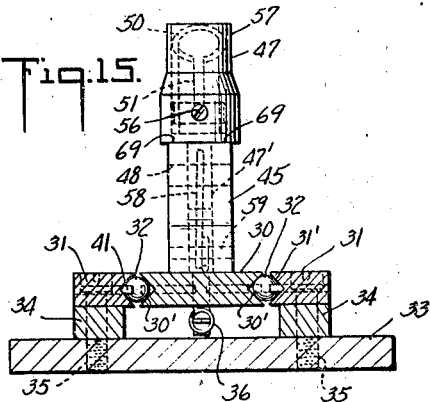
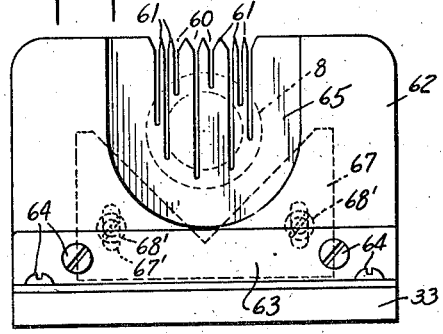
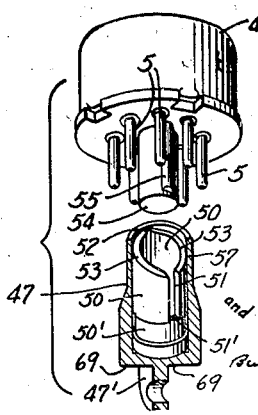

Dec. 21, 1943.   P. V. MATHIAS ET AL   2,337,055
APPARATUS FOR AND METHOD OF ASSEMBLING
RADIO TUBES AND RADIO TUBE BASES
Filed Jan. 4, 1941   5 Sheets-Sheet 4
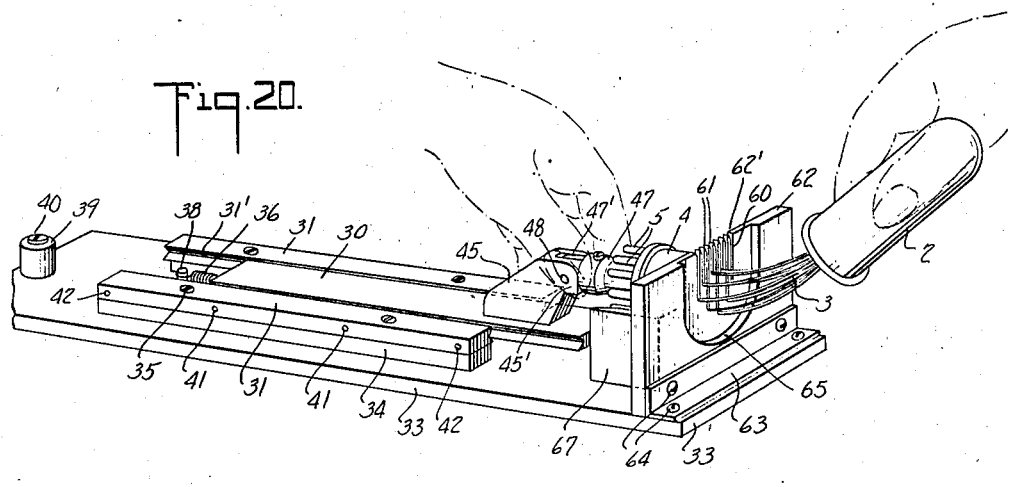
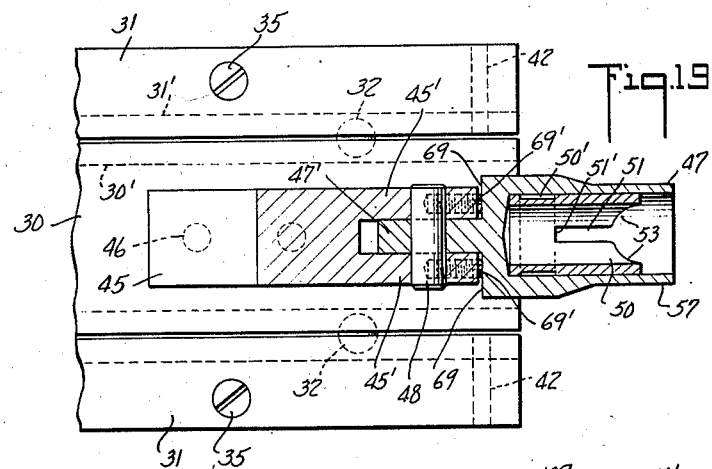
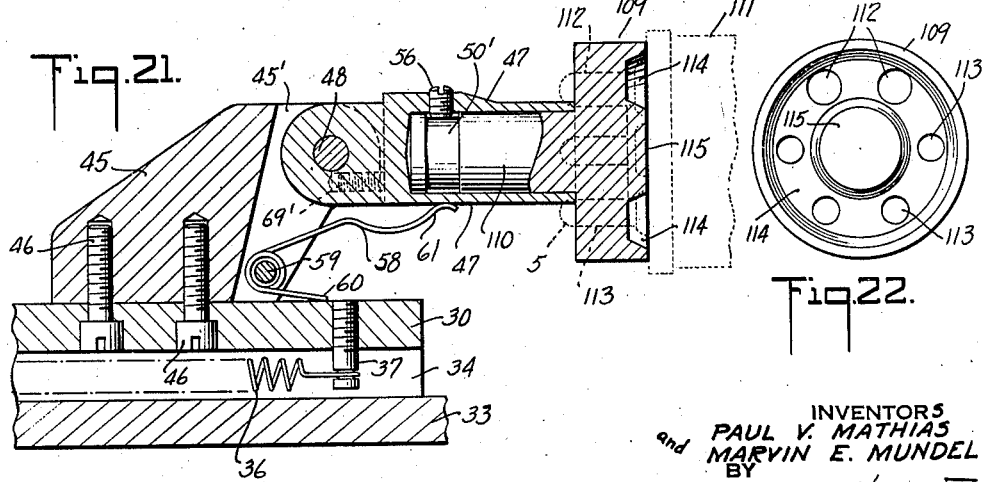
INVENTORS
PAUL V. MATHIAS
and MARVIN E. MUNDEL
BY
ATTORNEYS Dec. 21, 1943. P. V. MATHIAS ET AL 2,337,055
APPARATUS FOR AND METHOD OF ASSEMBLING
RADIO TUBES AND RADIO TUBE BASES
Filed Jan. 4, 1941 5 Sheets-Sheet 5
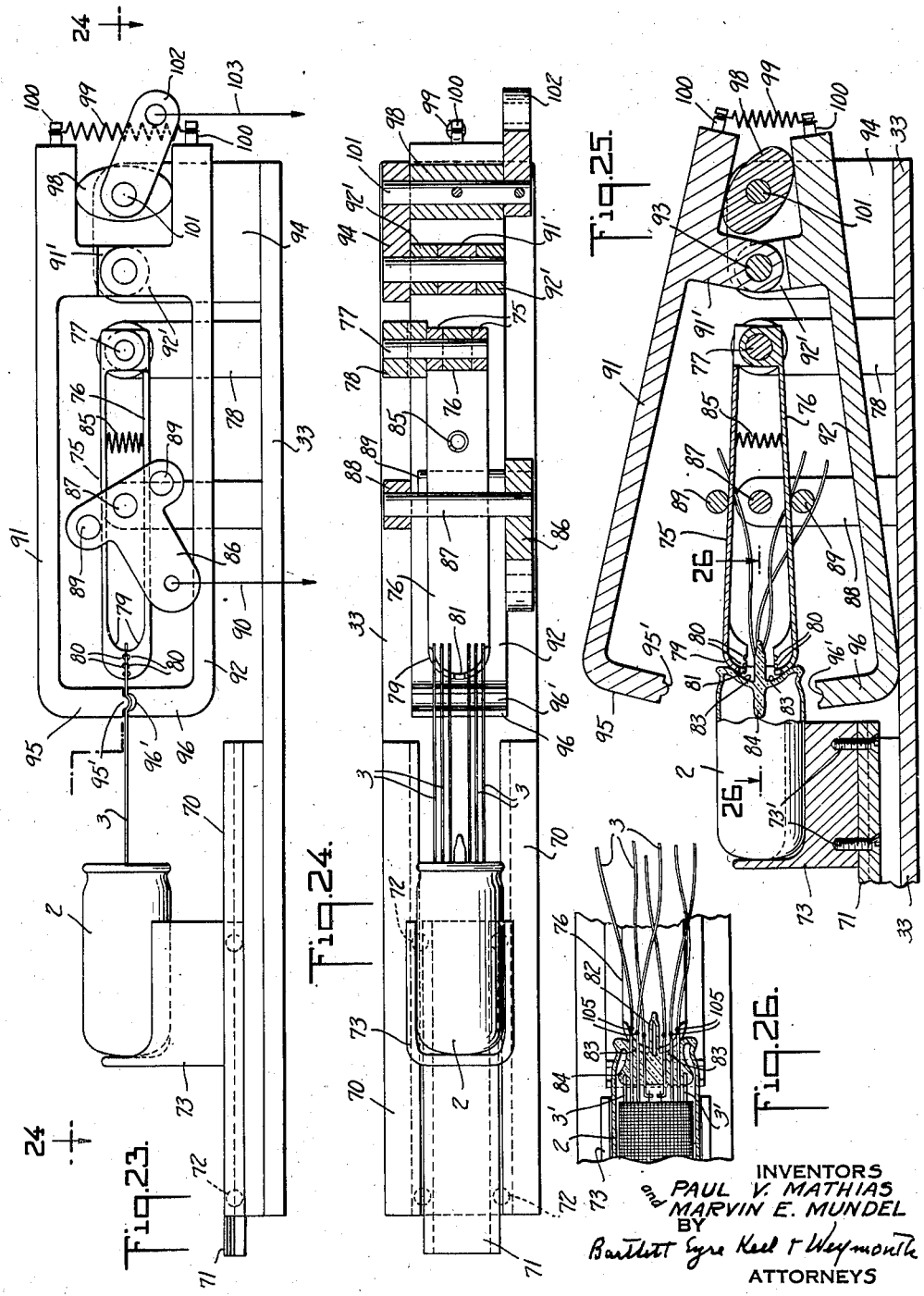
INVENTORS
PAUL V. MATHIAS
and MARVIN E. MUNDEL
BY
ATTORNEYS Patented Dec. 21, 1943

2,337,055

UNITED STATES PATENT OFFICE 2,337,055

APPARATUS FOR AND METHOD OF ASSEMBLING RADIO TUBES AND RADIO TUBE BASES

Paul V. Mathias, Maplewood, N. J., and Marvin E. Mundel, Peoria, Ill., assignors to Tung-Sol Lamp Works Inc., Newark, N. J., a corporation of Delaware Application January 4, 1941, Serial No. 373,200

28 Claims. (Cl. 250—27.5)

This application is a continuation of our application, Serial No. 312,882, filed January 8, 1940.

This invention relates to the manufacture of radio tubes, thermionic devices, and the like and particularly to apparatus for and method of assembling such devices and their bases.

The assembly of the bases on radio tubes, thermionic devices and the like involves tedious and costly steps according to the conventional practice, particularly in the threading of the leading-in conductors into the proper terminals of the multi-terminal base.

One object of the invention is a new device or apparatus and method of assembling the base upon the radio tube or other similar device with the leading-in conductors of the tube threaded into the desired terminals of the base.

Further objects of the invention will hereinafter appear.

For a better understanding of the invention reference may be had to the accompanying drawings forming a part of this application, wherein Fig. 1 is an end view of a device or apparatus embodying the invention;

Figs. 7 to 11 are views illustrating steps in the method of assembly according to the invention;

Fig. 12 is a view showing a modified form holding locating means for the base;

Fig. 13 is a side view partly in section of a modified apparatus;

Fig. 14 is a plan view thereof;

Fig. 15 is a sectional view along the line 15 of Fig. 13;

Fig. 16 is a sectional view along the line 16 of Fig. 13;

Fig. 17 is an end view of the apparatus;

Fig. 18 is an exploded view of a radio tube shell and the orienting device, with the latter partly in section;

Fig. 19 is a plan view of the shell support, partly in section along line 19—19 of Fig. 13;

Fig. 20 is a perspective view illustrating the last step in the threading operation;

Figs. 21 and 22 are views of a modification;

Fig. 23 is a side view of an apparatus for separating and straightening the lead-in wires preparatory to the threading operation;

Fig. 24 is a plan view partly in section thereof;

Fig. 25 is a sectional view of a part thereof; and

Fig. 26 is a sectional view of a detail taken on line 26—26 of Fig. 25.

Figure 1:
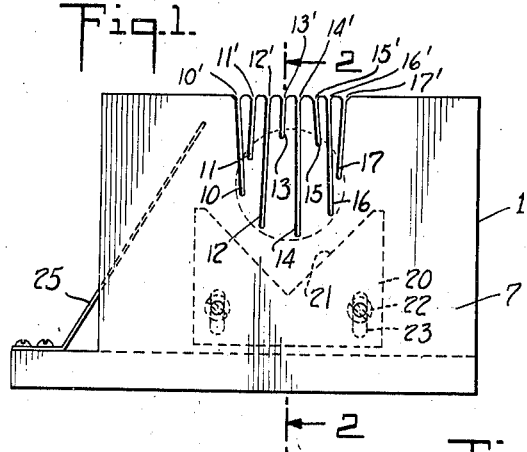
Figure 2:
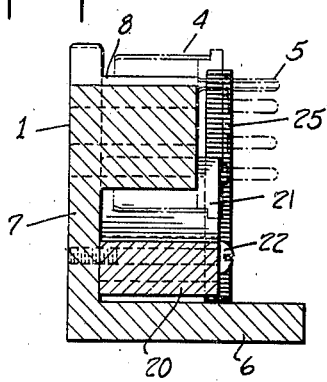
Fig. 2 is a cross-sectional view along the line 2—2 of Fig. 1.
Figure 3:
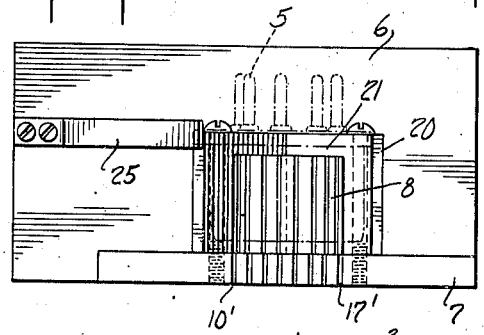
Fig. 3 is a plan view of the device.
Figure 4:
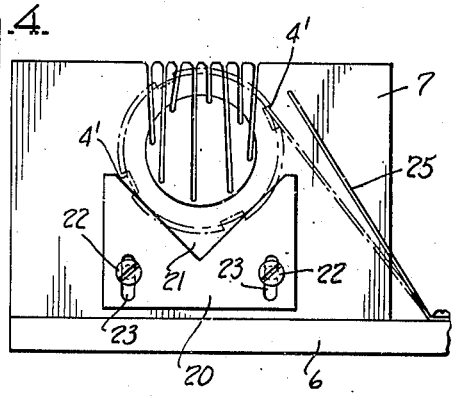
Fig. 4 is an end view of the device looking in the opposite direction from that shown in Fig. 1.

Referring to Figs. 1 to 6, the novel device or apparatus for facilitating and expediting the assembly of a radio tube and its base is shown and designated generally by the numeral 1. The radio tube without base is indicated as 2 and as having a multiplicity of leading-in conductors 3, these conductors in the conventional practice being substantially coplanarly disposed. A conventional base 4 is shown having the conventional tubular terminals 5, the tubular terminals 5 being adapted to receive the leading-in conductors 3.

The device or apparatus 1 comprises a supporting base 6 and an upstanding guide and positioning plate or member 7, the latter being supported upon the base 6 in any suitable manner, as for example, by being formed integrally therewith. The plate 7 carries in any suitable manner and on one side thereof a laterally projecting alining solid member 8, the latter preferably being cylindrical in form to correspond to the cylindrical shape of the base flange 4 which is inserted thereover, as will be described below.

The guiding and positioning members 7 and 8 are provided with a multiplicity of alined grooves, and in the particular embodiment shown there being 8 of these grooves 10 to 17, inclusive. These grooves are spaced longitudinally of the plate member 7, and their bottoms are in alinement with the tubular terminals 5 of the base 4 when the latter is located in position for the assembly operation. In the particular embodiment shown, the bottoms of these grooves form a circle to correspond to the circular disposition and spacing of the tubular terminals 5. The guiding and alining member 8 is mounted below the upper edge of the plate 7 and the grooves 10 to 17, inclusive, are continued upwardly through the plate 7 to the upper edge thereof to form the inlets 10' to 17', inclusive, for receiving the conductors 3 as below explained. The inlets 10' to 17', inclusive, preferably have their side walls beveled, as shown, so as to facilitate the positioning of the leading-in conductors 3 laterally thereinto.

The plate 7 carries underneath the guiding and alining member 8 a base support 20, the latter having an opening 21 formed in its upper side to receive the base 4. In the particular embodiment shown, this opening 21 is V-shaped, and the support 20 is positioned on the plate 7 in a manner properly to center and aline the base 4 with respect to the guiding and alining member 8. This support 20 is adjustably carried by the plate 7, as for example, by being fastened thereto by screws 22 passing through the elongated slots 23 formed in the support 20. The support 20 is preferably formed of a single integral block. The base 4, while being firmly supported by the member 20 and centered with respect to the guiding and alining member 8, may also be rotated thereon to bring the tubular terminals 5 into alinement with the bottoms of the slots 10 to 17, and in order to hold the base 4 in its proper oriented position, a spring member 25 is provided which is mounted on the base 6 and whose free end may be pressed down, as shown in dot and dash lines in Fig. 4, to bring it into holding engagement with the base, as for example with one of the notches 4' formed in the peripheral edge of the base which is adjacent the terminals 5. An alternative and preferred holding and retaining means for the base is illustrated in Fig. 12. This comprises a vertically adjustable rod 30 carrying a holder 30' through which passes a plunger rod 33 having a finger piece 35 on one end and a locking device 34 having a V-shaped face on the other end, the latter being adapted to engage the side of a terminal 5 and thereby hold the base in the proper oriented position. In the preferred arrangement this locking device 33—34 is mounted for horizontal reciprocation in a line at right angles to the terminals 5 and passing through the center line of the base 4. If desired, a spring 36 may be inserted between the finger piece or knob 35 and the holder 30' for automatically withdrawing the device when the finger is removed. The rod 30 may be mounted in any suitable manner, as, for example, by adjustably mounting it in a pedestal or base 31 carried by the base 6, and a screw 32 is shown for fastening the rod 33 in the adjusted position. The locating device is adjusted with respect to the base 4 and the member 8 so that when the locator 34 engages the side of one of the terminals 5 these terminals are in alignment with the bottoms of the grooves 10 and 17.

Figure 5:
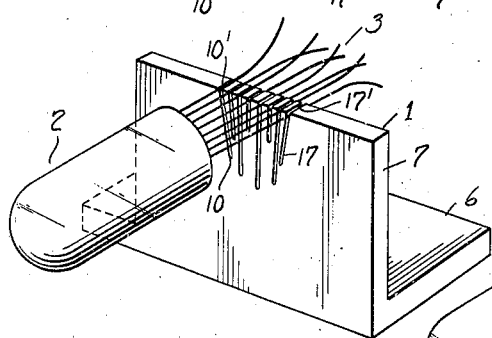
Figs. 5 and 6 are perspective views of the device and a radio tube without the base shown in connection therewith.
Figure 6:
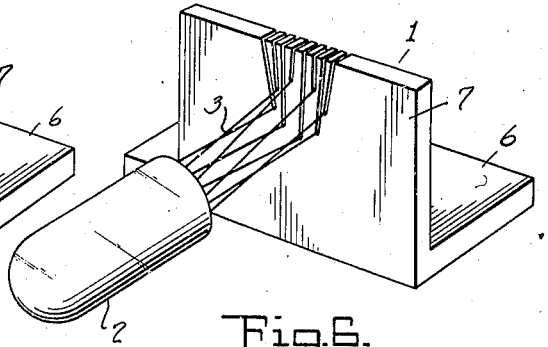

The steps in the operation of assembling the base of the tube are illustrated in Fig. 5 to 11. The operator positions the leading-in wires 3 laterally into the inlets 10' to 17' of the grooves, as indicated in Fig. 5, these leading-in wires 3 being selectively positioned in the grooves in a predetermined manner. With the tube and the conductors 3 in the position shown in Fig. 5, the tube with the leads is then lowered to bring the wires 3 within the grooves 10 to 17, to the predetermined position, as for example, illustrated in Fig. 6. The base 4 is inserted over the aligning member 8 and upon the support 20 and is rotated to the predetermined oriented position and is there held either by the spring finger 25 of Fig. 1 and 4 or by the locator 33, 34 of Fig. 12. With the base thus firmly held in the oriented position, the operator then pulls the tube 2 backwardly to cause the ends of the conductors 3 to engage the bottoms of the grooves, and to facilitate and expedite this operation the tube 2 is elevated and turned at an angle to the bottoms of the grooves as indicated in Figs. 7 and 8, the operator at the same time pressing down slightly on the tube to cause the free ends of the leading-in wires to engage firmly the bottoms of the grooves which are in alignment with the tubular terminals 5 of the base. The arrow shown in Fig. 8 indicates the downward pressure applied to the conductors 3 which are disposed in the grooves. With the pressure still applied to cause the conductors 3 to bear with their ends against the bottom of the grooves, the tube 2 is then moved towards the plate 7 to cause the free ends of the conductors 3 to enter the tubular terminals as indicated in Fig. 9. The base 4 is then moved outwardly far enough to clear the guiding and aligning member 8, without, however, moving the same far enough to remove the tubular terminals 5 from the ends of the conductors 3 as shown in Fig. 10. The tube 2 and the base 4 may be laterally lifted from the device, as indicated in Fig. 11, with the leading-in conductors properly positioned in the tubular terminals. The base and the tube may then be sealed in any conventional manner and the conductors 3 electrically connected in any suitable manner to the tubular terminals 5, the surplus projecting ends of the conductors being severed. By having the guide and aligning plate 7 project above the guiding and aligning member 8, the positioning of the desired conductors 3 laterally into the inlets 10' to 17', inclusive, of the grooves is facilitated, and with the projecting ends of the conductors 3 crossed and out of alignment, as indicated in Fig. 5, these out of alignment and crossed ends may be readily forced into the desired grooves by withdrawing the tube 2 a sufficient distance to enable the outer ends of the grooves formed in the plate 7 to perform a guiding and positioning function. This operation is shown in Fig. 6 wherein the conductors 3 are indicated as being disposed approximately at the bottoms of the grooves.

With the apparatus shown and by following the operations described, an operator may assemble a substantially greater quantity of bases upon the tubes than with the conventional practice of threading the conductors one by one in the tubular terminals 5.

The device of the apparatus shown is adapted to thread bases upon tubes having eight separate leading-in conductors, a conductor for each groove, but in cases where there are less than eight conductors to be threaded, one or more of the grooves is not used in the assembly. It is observed that in the specific embodiment shown the grooves 10 and 17 flare outwardly slightly towards their inlets, while the grooves 11 and 16 flare slightly inwardly in the outward direction, and the other grooves are similarly arranged so as to provide the desired spacing of the inlets 10' to 17'; but it is understood that the specific structure shown may be departed from without departing from the invention.

In the embodiment of the invention disclosed in Figs. 13 to 20, the tube shell to be threaded is mounted on a movable carriage 30 which in turn is mounted to move horizontally on the trackways 31 with ball bearings 32 interposed between the tracks 31 and the carriage 30. The carriage 30 and the tracks 31 are provided with mating V-shaped trackways 30' and 31'. The trackways 31 are mounted upon a base 33 and are spaced therefrom by means of bars 34, the tracks and the bars 34 being anchored to the base 33 by any suitable means as, for example, the screw-bolts 35. The track 30 is normally urged in one direction, to the left as indicated in the drawings, by means of a spring 36, one end of which spring is fastened to a pin 37 projecting downwardly from the track 30 at the right end and the other end of the spring is fastened to a similar pin 38 projecting upwardly from the base 33. A buffer stop 39 of any suitable material as, for example, of rubber, is fastened to the left end of the base 33 and disposed in the path of the track 30 to limit its movement to the left under the influence of the spring 36. This buffer member is fastened to the base 33 in any suitable manner as, for example, by a screw-bolt 40. The ball bearings 32 are retained in the raceways 30' and 31' in any suitable manner as, for example, by means of pins 41 disposed in openings formed laterally of the tracks 31 and projecting into the path of the bearings 32. Similar pins 42 are disposed within openings formed on the opposite sides and at the ends of the carriage 30. These pins 42 cooperate with the pins 41 to retain the bearings in the operative position.

The carriage has mounted on the right end thereof and on its upper side a bracket 45, which is secured to the track 30 in any suitable manner as, for example, by means of the screw-bolts 46. A base shell support and carrier 47 is pivotally mounted on the bracket 45 as, for example, being pivotally mounted on an axis 48 through the medium of a pin passing through a lug formed on the lower end of the member 47 and through openings formed in jaws 45' between which is disposed the lug on the bottom of the carrier. The lug is indicated at 47'. The axis of pivotal movement is at right angles to the direction of movement of the carriage 30, in the particular embodiment shown, and the shell carrier 47 is capable of assuming either a substantially vertical position or a substantially horizontal position as illustrated in Fig. 13. This shell carrier member 47 is in the form of a hollow sleeve or cup-like member and a positioner or orienting device 50 is disposed within this hollow member 47. The orienting member 50 is also of sleeve-like or cup-like form and has a longitudinal slot 51 formed in the upper part thereof. The upper end of the positioning member 50 is beveled off from a point 52 on both sides thereof downwardly to the slot 51 to form cam or guiding surfaces 53 for turning and orienting a shell 4 when the latter is positioned on the carrier. The internal diameter of the positioning member 50 is just large enough to accommodate freely the conventional projecting pin 54 carried by a shell of the type illustrated. This projecting pin 54 carries on the side thereof a key-like member 55 which is accommodated by the slot 51 formed in the positioning member 50. When the shell 4 is positioned upon the shell carrier 47 with the projecting pin 54 disposed in the upper end of the positioning and orienting member 50, the key member 55, if the shell is not properly oriented, engages one of the cam or guiding surfaces 53 to prevent the stable support of the shell in that angular position and to rotate the shell to a position wherein the key 55 can enter the slot 51. A stable and properly oriented position is reached when either the lower end of the key 55 engages the bottom 51' of the slot or the lower end of the pin 54 engages the bottom of the cup-like positioning member 50 or the shell engages the top of the carrier 47. The positioning and orienting member 50 may be angularly adjusted within the shell carrier 47 to give the correct orientation for the particular tube shell being worked upon, and the positioner can then be fixed in that position by means of a set-screw 56 passing through the barrel of the carrier 47 and engaging the outer surface of the positioner 50. In the particular embodiment shown, the positioner 50 is milled off around its exterior at 50' and the set-screw 56 is adapted to engage this milled out portion. The hollow terminal pins 5 are disposed on the outside of the carrier 47 when the shell is in its supported and oriented position and the upper end of the carrier 47 has its walls reduced as indicated at 57 to readily accommodate these terminals 5 thereabout.

The shell carrier 47 is normally urged in an upward direction by means of a spring 58 mounted on a pin 59 carried by the bracket 45 and having one end 60 engaging the track 30 and its other end 61 engaging the carrier 47 and tending to operate the carrier 47 to a vertical position.

The cooperating threading member 1' is generally similar to the threading member 1 described above, except that the guiding slots 60 for the lead conductors are not inclined but are all vertically disposed and the walls forming these slots are provided with upper guiding V's 61 to facilitate the positioning of the wires 3 within these slots 60. In this embodiment the member 1' is removably mounted so that it can be replaced with a different threading device corresponding, as for example, to a different type of radio tube shell.

It comprises a vertical plate 62 which is mounted at its lower edge upon the base 33 and is fastened thereto by an angle member 63, the latter being fastened to the base 33 and to the vertical plate 62 by means of the screw bolts 64. This plate 62 carries the cylindrically shaped member 8 which is preferably formed integrally therewith. This plate is cut away on the right side to form a U-shaped recess 65 and the upper edge 62' of the part 62 extends above the level of the upper part of the cylindrical member 8.

Fig. 13 shows in dot and dash line the position of the support 47 and the shell 4 when it is in position for threading. In this position the shell 4 is held in the horizontal position so as to aline the openings in terminal pins 5 with the bottoms of the slots 60 and the means for supporting the shell in the exact horizontal position is the member 67 having a V-shaped seat for the shell. This member 67 is mounted upon the plate 62 and is milled off at its outer edge to form a cam surface 68 for facilitating the operation of bringing the support 47 and shell into the correct threading position, the shell engaging and riding up the incline 68, if it should happen to be disposed slightly below the horizontal position shown in dotted lines when it is in a position to be brought over to the right. It is understood that the shell support 47 is adjusted to assume a substantially horizontal position when it is turned over to the right. When the support 47 is turned over to the right to the dotted position shown in Fig. 13 its shoulders 69 which are disposed on the opposite sides of the lug 47' engage set screws 69' which are screw-threadedly mounted in the forks 45' of the bracket 40. These screw bolts 69' are adjusted so as to limit or prevent the movement of the support 47 below the horizontal. The V-support 67 is fastened to the plate 62 by means of bolts 68', the latter passing through openings formed in the V-support and screw-threadedly engaging openings formed in the plate 62. The openings 67' through which these bolts 68' pass are elongated in the vertical direction to permit up and down adjustment of the support 67.

The movable support thus forms the orienting means for imparting to the shell 4 the correct angular position and the supporting means 67 performs the function of horizontally alining the terminal pins 5 with the bottoms of the slots 69. In operation, the operator positions the shell 4 with the pin 54 in the upper end of the positioner 59. The shell 4, either by its own weight or by positive rotation by the operator, will be rotated to a position where the key 55 registers with and enters the slot 51. The operator then engages the bracket 45 and the support 47, or either of these, and with the support 47 pivoted over against the tension of the spring 58 into a substantially horizontal position to the right, as indicated in Fig. 13, at the same time moves the carriage over to the right against the tension of the spring 36 to cause the terminal pins 5 to register with the bottoms of the slots 69, the barrel 8 being disposed in the shell and engaging the bottom of the shell with the terminals properly aligned. At the same time the operator has positioned the lead wires 3 within the slots 69 with the ends of the wires engaging the bottoms of the grooves and when the shell is brought to the threading position the ends of the lead wires are caused to enter the terminals 5 as described above with respect to the modification of Figs. 1 to 10. The operator uses one hand to manipulate the shell and support 47, and the other to manipulate the tube and wires 3 (Fig. 20).

In the embodiment of Figs. 21 and 22 the orienting member 109 comprises a solid cylindrical member 110 which is disposed within the support 47, this member being angularly adjustable by releasing the set screw 56, the latter engaging the groove 50' formed on the periphery of the member 110. The orienting member 109 is adapted to accommodate a different type of shell from that shown in Fig. 18. This shell 111 is provided with the plug terminals 5 but does not embody the central pin 54. The positioner or orienting member 109 is provided with openings 112 and 113 for the reception of the plug terminals 5 of the shell, and the shell is simply positioned on the member 109 with the plug terminals 5 passing through these openings 112 and 113. On its outer face the member 109 is provided with an annular groove 114 from which the openings 112 and 113 extend, thereby leaving in the center an abutment 115 which supports the central part of the shell 111. It is observed that the openings 112 are larger than the openings 113 and these form a guide for the operator to facilitate the correct orientation of the shell. The operator merely drops the shell 111 on this support 109 with the plug terminals of the shell corresponding to the openings 112 passing therethrough, whereupon she rotates the support 47 over to the right against the tension of the spring 58, similarly to the operation described above with respect to Figs. 14 to 20. It is understood that in Fig. 21 the support 47 is positively held in the position there shown against the tension of spring 58.

An important step in the threading operation is the straightening and stretching of the wires 3 prior to the step of positioning these wires within the slots 69. A method and apparatus for carrying out this step of the threading operation is shown in Figs. 23 to 26. The apparatus for effecting this operation comprises a base 33, which may be separate from or a continuation of the base 33 shown in Figs. 14 to 17. Upon this base is mounted a track 70 generally similar to the track 31 described above, and between or on this track a carriage 71 is mounted for movement back and forth. At 72 are diagrammatically indicated ball bearings or rolling pins disposed between the tracks 70 and the carriage 71 for facilitating movement of the carriage. The carriage carries a seat or mount 73 for a radio tube 2. The radio tube 2 is supported freely on this seat 73 and is movable with the carriage to and from a straightening and stretching mechanism shown mounted to the right of the track 70 on the base 33.

This mechanism comprises a pair of separator jaws 75, 76 which are pivotally mounted at one end on a carrying pin 77, the latter being carried by a bracket or support member 78 projecting upwardly from the base 33. The left ends of these separator jaws 75 and 76 are provided with inwardly turned gripping and separating elements 79, these elements 79 being provided with matching or mating recesses 80 to accommodate the lead-in conductors when the two jaws are brought together. Each of these gripping parts 79 is also provided with a centrally disposed mating notch or recess 81 to accommodate the exhaust tube 82 of the radio tube. The gripping parts 79 are rounded off to conform to the exterior curvature of the press 84; that is, when the jaws 75 and 76 are brought together with their gripping parts 79 engaged, the exterior surface of the gripping parts 79 form a substantially snug fit with the curved end part 83 of the tube. Accordingly, irrespective as to what extent the wires 3 may be twisted and misplaced, as indicated in Fig. 26, the separator jaws 75, 76 engage or embrace the roots of these wires 3 at the points where they emerge from the press 84, and, by relatively moving the tube and the jaws 75, 76, the wires 3 are separated from each other. For facilitating the operation of the jaw members 75 and 76, there is provided a spring 85 diagrammatically shown and engaging the inner sides of the separating jaw members 75, 76 and applying a force thereto tending to separate the gripping parts 79 from each other. For bringing the gripping parts 79 of the jaws together against the tension or force of the spring 85, there is provided an operating member 86 which is pivotally mounted on a pin 87 carried by a support 88, which is mounted on the base 33. The pin 87 passes between the jaw members 75 and 76 and the operating member 86 is provided with pins 89 which engage the outer surfaces of the separating jaws 75 and 76 to bring the gripping parts 79 together when the operating member 86 is rocked about the axis of the pin 87. This rocking of the member 86 may be effected in any suitable manner, as for example, manually, and at 90 there is shown a manually operated means which extends, as for example, to an operating foot pedal (not shown for convenience in operation).

For facilitating the separating and straightening operation of the wires there is illustrated a pair of straightening jaw members 91 and 92 having inwardly projecting pivotal bracket members 91' and 92' for pivoting on a carrying pin 93. The latter is carried by a plate or bracket member 94 mounted on the base 33. The straightening jaw members 91 and 92 are provided with mating inwardly turned gripping parts 95 and 96, which are adapted to be brought together to grip the wires 3 therebetween and apply a stretching and straightening operation thereto. In the particular embodiment shown, these gripping parts 95 and 96 are provided with mating male and female parts 95' and 96', but it is understood that any form of gripping surface may be provided, the purpose being to grip the wires tightly so as to apply a stretching and a straightening operation thereto as relative movement is imparted to the straightening jaws and the radio tube 2.

The straightening jaws 91 and 92 may be operated in any suitable manner, as for example, by a cam member 98 engaging projecting ends of the supporting jaw members 91 and 92 beyond the pivot pin 93. A tension spring 99 is fastened to pins 100 on the ends of the jaws 91 and 92 and tends to separate the gripping parts 95 and 96. The cam 98 is mounted on a pin 101 which is carried by the plate or bracket 94, the cam being keyed or fastened to the pin which forms a shaft rotating in an opening or bearing formed in the member 94. The cam 98 may be operated in any suitable manner, as, for example, manually, and there is illustrated an arm 102 projecting from the cam and having an operating means 103 illustrated diagrammatically and extending to a foot pedal (not illustrated for convenience in illustration).

The operation of the mechanism shown in Figs. 23 to 26 inclusive is as follows:

The operator positions a radio tube 2 upon the seat 73 with its wires criss-cross and twisted together as indicated somewhat in Fig. 26. With the supporting jaws 75 and 76 and the straightening members 91 and 92 separated and disposed in the inoperative position as shown in Fig. 25, the operator brings the radio tube and its carriage to the position shown in Fig. 25. In this position the gripping parts 79 are brought more closely together and simultaneously with their engagement to embrace the wires, the tube 2 is brought to the position shown in Fig. 26 with the mating notches 80 of the jaws 79 engaging or surrounding the individual wires 3 at their emergence from the press 84. The gripping jaws 79 are held in this position and the radio tube and its carriage are slightly withdrawn to a position to clear the gripping parts 95 and 96 of the jaw members 91 and 92. The gripping parts 95, 96 then are brought together against the tension of the spring 99 and caused to engage the wires 3 at a point between the tube 2 and the jaws 79. These jaws 95 and 96 are caused to grip the wires sufficiently tight to enable a stretching and straightening force to be applied thereto as the tube and the jaws are relatively separated. The operator thereupon forcefully withdraws the radio tube 2 while the gripping jaws are all in operative position, the jaws 79 separating the wires as the relative separation movement proceeds and the jaws 95 and 96 applying force to the wires to tension and straighten them. In this operation the wires 3 are not only separated from each other but are set so that they remain separated while the operator then proceeds to thread the wires into the shell as described above. The grippers 79 preferably embrace without tightly engaging the wires 3, so as not to rupture the welds 105 between the lead extensions 3 and the lead-in wires 3' proper.

We claim:

1. A device for facilitating the assembly of bases on radio tubes and the like, comprising a guiding and aligning member, means for supporting a base shell adjacent said member, said shell having spaced terminals, and said guiding and aligning member having grooves corresponding to said terminals for the reception of leading-in wires, with the bottoms of said grooves being in alignment with the terminals of the base, the guiding and aligning member comprising a plate part and a cylindrical part carried thereby, with the plate part projecting beyond the cylindrical part, and with the grooves continuing through both the plate part and the cylindrical part.

2. A device for facilitating the assembly of bases on radio tubes and the like, comprising a guiding and aligning member, means for supporting a base shell adjacent said member, said shell having spaced terminals, and said guiding and aligning member having grooves corresponding to said terminals for the reception of leading-in wires, with the bottoms of said grooves being in alignment with the terminals of the base, the guiding and aligning member comprising a plate part and a cylindrical part carried thereby, with the plate part projecting beyond the cylindrical part, and with the grooves continuing through both the plate part and the cylindrical part, and means for holding a base in an oriented position.

3. A device for facilitating the assembly of bases on radio tubes and the like, comprising a guiding and aligning member, means for supporting a base shell adjacent said member, said shell having spaced terminals, and said guiding and aligning member having grooves corresponding to said terminals for the reception of leading-in wires, with the bottoms of said grooves being in alignment with the terminals of the base, the guiding and aligning member comprising a plate part and a cylindrical part carried thereby, with the plate part projecting beyond the cylindrical part, and with the grooves continuing through both the plate part and the cylindrical part to the bottoms thereof, and means for supporting a base which is adjustably mounted on the plate part and disposed beneath the cylindrical part.

4. The method of assembling a radio tube or the like having a multiplicity of leading-in conductors with a base having a plurality of terminals which consists in positioning the tube with the conductors thereof disposed in grooves of different depths formed in a guiding and aligning member, positioning a base adjacent thereto with terminals in alignment with the bottoms of the grooves, manipulating the tube to cause the ends of the leading-in conductors to engage and slide along the bottoms of the grooves and bringing the tube and the base relatively closer together to cause the leading-in conductors to enter the aligned terminals of the base.

5. A device for facilitating the assembly of bases on radio tubes and the like, comprising a guiding and aligning member, means for supporting a base shell adjacent said member, said shell having spaced terminals, and said guiding and aligning member having grooves corresponding to said terminals for the reception of leading-in wires, with the bottoms of said grooves being in alignment with the terminals of the base and means being provided for holding the base shell in the proper oriented position with respect to the leading-in wires.

6. A device for facilitating the assembly of bases on radio tubes and the like, comprising a guiding and aligning member, means for supporting a base shell adjacent said member, said shell having spaced terminals, and said guiding and aligning member having grooves corresponding to said terminals for the reception of leading-in wires, with the bottoms of said grooves being in alignment with the terminals of the base and means being provided for holding the base shell in the proper oriented position with respect to the leading-in wires, said means comprising a movable locating member which is adapted to engage and hold one of the terminals.

7. A device for facilitating the assembly of bases on radio tubes and the like, comprising a guiding and aligning member, means for supporting a base shell adjacent said member, said shell having spaced terminals, and said guiding and aligning member having grooves corresponding to said terminals for the reception of leading-in wires, with the bottoms of said grooves being in alignment with the terminals of the base and means being provided for holding the base in the oriented position comprising a spring member adapted to engage the base periphery.

8. A means for facilitating the assembly of bases on radio tubes and the like, comprising a guiding and aligning member, a support for supporting a base shell adjacent said member, said shell having spaced terminals and said guiding and aligning member comprising a drum having grooves corresponding to said terminals for the reception of leading-in wires with the bottoms of said grooves being in alignment with the terminals of the base.

9. A device for facilitating the assembly of bases on radio tubes and the like, comprising a guiding and aligning member, a support for supporting a base shell adjacent said member, said shell having spaced terminals and said guiding and aligning member comprising a plate having vertical grooves corresponding to said terminals for the reception of said leading-in wires with the bottoms of said grooves being in alignment with the terminals of the base.

10. A means for facilitating the assembly of bases on radio tubes and the like, comprising a guilding and alining member, a support for supporting a base shell adjacent said member, said shell having spaced terminals and said guiding and alining member comprising a drum having grooves corresponding to said terminals for the reception of leading-in wires with the bottoms of said grooves being in alinement with the terminals of the base.

11. A means for facilitating the assembly of base shells on radio tubes and the like comprising a guiding and alining member with recesses for the accommodation of leading-in wires and a tubular support for a base having a slot on one side for accommodating an element of the base and orienting the shell, and means supporting said support adjacent said guiding and alining member whereby the base may be alined with the said recesses.

12. A means for facilitating the assembly of base shells on radio tubes and the like comprising a guiding and alining member with recesses for the accommodation of leading-in wires and a tubular support for a base having a slot on one side for accommodating an element of the base and orienting the shell, and means supporting said support adjacent said guiding and alining member whereby the base may be alined with the said recesses, the supporting means for the support being pivotally mounted for assuming two different positions.

13. A means for facilitating the assembly of base shells on radio tubes and the like comprising a guiding and alining member with recesses for the accommodation of leading-in wires and a tubular support for a base having a slot on one side for accommodating an element of the base and orienting the shell, and means supporting said support adjacent said guiding and alining member whereby the base may be alined with the said recesses, the supporting means comprising a movable carriage which is movable toward and away from said guiding and alining member.

14. A means for facilitating the assembly of base shells on radio tubes and the like comprising a guiding and alining member with recesses for the accommodation of leading-in wires and a tubular support for a base having a slot on one side for accommodating an element of the base and orienting the shell, and means supporting said support adjacent said guiding and alining member whereby the base may be alined with the said recesses, the supporting means for the support comprising a carriage which is movable toward and away from said guiding and alining member and said support being pivotally mounted on said carriage for occupying two different angular positions.

15. A means for facilitating the assembly of base shells on radio tubes and the like comprising a guiding and alining member with recesses for the accommodation of leading-in wires and a tubular support for a base having a slot on one side for accommodating an element of the base and orienting the shell, and means supporting said support adjacent said guiding and alining member whereby the base may be alined with the said recesses, the supporting means for the support comprising a carriage which is movable toward and away from said guiding and alining member and said support being pivotally mounted on said carriage for occupying two different angular positions, said support being biased to one of its angular positions and said carriage being biased away from said guiding and alining member.

16. A means for facilitating the assembly of bases on radio tubes and the like comprising a guiding and alining member with recesses for the accommodation of leading-in wires and a tubular support for a base having a slot on one side for accommodating an element of the base and orienting the shell, and means supporting said support adjacent said guiding and alining member whereby the base may be alined with the said recesses, said tubular support having its upper end beveled off downwardly to said slot from a point opposite the slot whereby the element of the base shell which is to be accommodated by the slot slides downwardly to the orienting slot as the shell is rotated.

17. A means for facilitating the assembly of bases on radio tubes and the like comprising a guiding and alining member with recesses for the accommodation of leading-in wires and a tubular support for a base having a slot on one side for accommodating an element of the base and orienting the shell, and means supporting said support adjacent said guiding and alining member whereby the base may be alined with the said recesses, said tubular support being adjustably mounted upon the supporting means.

18. A means for facilitating the assembly of bases on radio tubes and the like comprising a guiding and alining member with recesses for the accommodation of leading-in wires and a tubular support for a base having a slot on one side for accommodating an element of the base and orienting the shell, means supporting said support adjacent said guiding and alining member whereby the base may be alined with the said recesses, and said supporting means comprising a V-shaped support adjacent said guiding and alining member for supporting a base shell in alinement with the recesses and another support for orienting said shell, said V-shaped support having a cam surface at its outer end.

19. A means for facilitating the assembly of base shells on radio tubes and the like comprising a guiding and alining member with recesses for the accommodation of leading-in wires and a tubular support for a base having a slot on one side for accommodating an element of the base and orienting the shell, and means supporting said support adjacent said guiding and alining member whereby the base may be alined with the said recesses, the carriage carrying said support and being mounted on roller bearings and the base support being mounted on a bracket supported on the carriage, said carriage being biased by a spring in one direction and a buffer member disposed in the path of the carriage.

20. In a device for facilitating the threading of leading-in wires of radio tubes and the like into base shell terminals comprising a guiding and aligning member having elongated grooves for the reception of said leading-in wires with the ends of the wires disposed in the grooves, said grooves having outlets, and means for supporting a base shell in juxtaposition to the guiding and aligning member with its terminals closely adjacent to and aligned with the outlets of the grooves so as to provide for easy transfer of the ends of the wires from the grooves into the terminals when the tube is moved relatively to the guiding and aligning member.

21. A device for facilitating the threading of leading-in wires of radio tubes and the like into base shell terminals comprising a guiding and aligning member having grooves for the reception of said leading-in wires, said grooves forming guides for said wires, and means in juxtaposition to the guiding and aligning member supporting a base shell with its terminals closely adjacent to and aligned with the grooves so as to provide for easy transfer of the ends of the wires from the grooves into the terminals when the tube is moved relatively to the guiding and aligning member.

22. A device for facilitating the assembly of base shells having spaced terminals on radio tubes and the like, comprising a guiding and aligning member having grooves corresponding to said terminals for the reception of leading-in wires, means supporting a base shell adjacent said member, with said grooves disposed in alignment with the terminals of the base and forming guides guiding the wires to the terminals and means orienting the base shell with respect to the aligning member.

23. A means for facilitating the assembly for bases on radio tubes and the like comprising a guiding and aligning member with recesses formed therein for the accommodation of leading-in wires of the tube, a support for a base shell having means thereon engaging a shell and orienting the same when the shell is positioned on the support and movable means carrying said support and moving the same either to a position adjacent said guiding and aligning member or to a point removed from said member whereby a base shell may be mounted on said support and the latter moved to a position adjacent to the aligning and guiding member for alignment with said recesses.

24. A means for facilitating the assembly of base shells with terminals on radio tubes and the like comprising a guiding and aligning member having recesses for the reception of the leading-in wires of a tube, a support for supporting a shell in predetermined oriented relation with respect to said guiding and aligning member, and movable means carrying said support and occupying one position removed from the aligning member wherein a base shell is loaded on the support and another position adjacent said aligning member wherein the base terminals are aligned with said recesses, a fixed supporting means being provided adjacent said guiding and aligning member for assisting said movable means in aligning said shell with the aligning member when the movable carrying means is in one position, said fixed supporting means comprising a V-shaped support having a cam surface at its outer end for the purpose set forth.

25. In an apparatus for facilitating the assembly of base shells having spaced terminals on radio tubes and the like the combination of a fixed guiding and aligning member having wire guiding grooves corresponding to said terminals for the reception of leading-in wires, and means supporting a base shell adjacent said fixed member with said grooves disposed in alignment with the terminals of the base, said means comprising a V-shaped support.

26. The method of threading the leading-in wires of radio tubes and the like into terminals of base shells which consists in positioning a tube with the leading-in conductors thereof disposed in grooves formed in a guiding member, positioning a base shell adjacent thereto with its terminals in alignment with and closely adjacent to the outlets of the grooves, manipulating the tube to cause the ends of the leading-in conductors to engage and slide along the grooves and from there into the base shell terminals with the latter forming substantial continuations of the grooves.

27. A means for facilitating the threading of the leading-in wires of radio tubes and the like into base shell terminals comprising an aligning member for aligning and guiding the wires, a track leading towards and away from said aligning member, a carriage movably mounted on said track and a base shell support on said carriage for presenting said base shell to the aligning member with the terminals of the shell aligned with the leading-in wires.

28. In a device for facilitating the threading of leading-in wires of radio tubes and the like into base shell terminals comprising a guiding and aligning member having elongated grooves for the reception of said leading-in wires with the ends of the wires disposed in the grooves, said grooves having outlets, and means for supporting a base shell in juxtaposition to the guiding and aligning member with its terminals closely adjacent to and alined with the outlets of the grooves so as to provide for easy transfer of the ends of the wires from the grooves into the terminals when the tube is moved relatively to the guiding and alining member, the means for supporting a base shell being pivotally mounted.

PAUL V. MATHIAS.
MARVIN E. MUNDEL.